United States Patent
Urzhumov

(10) Patent No.: US 10,200,069 B1
(45) Date of Patent: Feb. 5, 2019

(54) LARGE AREA METAMATERIAL ANTENNA OPTIMIZATION

(71) Applicant: Searete LLC, Bellevue, WA (US)

(72) Inventor: Yaroslav A. Urzhumov, Bellevue, WA (US)

(73) Assignee: THE INVENTION SCIENCE FUND I, LLC, Bellevue, WA (US)

(*) Notice: Subject to any disclaimer, the term of this patent is extended or adjusted under 35 U.S.C. 154(b) by 0 days.

(21) Appl. No.: 15/900,564

(22) Filed: Feb. 20, 2018

(51) Int. Cl.
| | |
|---|---|
| H04B 1/04 | (2006.01) |
| H04B 1/18 | (2006.01) |
| H04B 7/0456 | (2017.01) |
| H01Q 21/00 | (2006.01) |
| H01Q 21/24 | (2006.01) |

(52) U.S. Cl.
CPC ....... H04B 1/0458 (2013.01); H01Q 21/0006 (2013.01); H04B 1/18 (2013.01); H04B 7/0456 (2013.01); H01Q 21/245 (2013.01)

(58) Field of Classification Search
CPC ...... H04B 1/0458; H04B 1/18; H04B 7/0456; H01Q 21/0006; H01Q 21/245; H01Q 15/0086
See application file for complete search history.

(56) References Cited

U.S. PATENT DOCUMENTS

| | | | | |
|---|---|---|---|---|
| 6,876,337 | B2 * | 4/2005 | Larry | H01Q 11/08 343/818 |
| 2003/0123565 | A1 | 7/2003 | Fukuda et al. | |
| 2008/0292011 | A1 | 11/2008 | Yang | |
| 2009/0284431 | A1 * | 11/2009 | Meharry | H01Q 9/065 343/816 |
| 2011/0003608 | A1 | 1/2011 | Forenza et al. | |
| 2011/0086598 | A1 * | 4/2011 | Ali | H01Q 3/267 455/115.1 |
| 2017/0063344 | A1 * | 3/2017 | Broyde | H03H 11/30 |

* cited by examiner

*Primary Examiner* — Syed Haider

(57) ABSTRACT

In one embodiment, an antenna system performance metric for a tunable antenna system comprising tunable impedance elements is identified. The tunable impedance elements are simulated as uniquely numbered lumped ports characterizing a port network with a corresponding admittance or impedance matrix. The admittance or impedance matrix can be approximated using the periodicity of the tunable antenna system and the S-matrix of the port network can be estimated using the approximated admittance or impedance matrix. An optimal configuration of the tunable antenna system with respect to the antenna system performance metric is identified from responses of the tunable antenna system to variable impedances using the S-matrix. The optimal configuration of the tunable antenna system includes impedances of the tunable impedance elements modeled as the lumped ports in the port network.

41 Claims, 12 Drawing Sheets

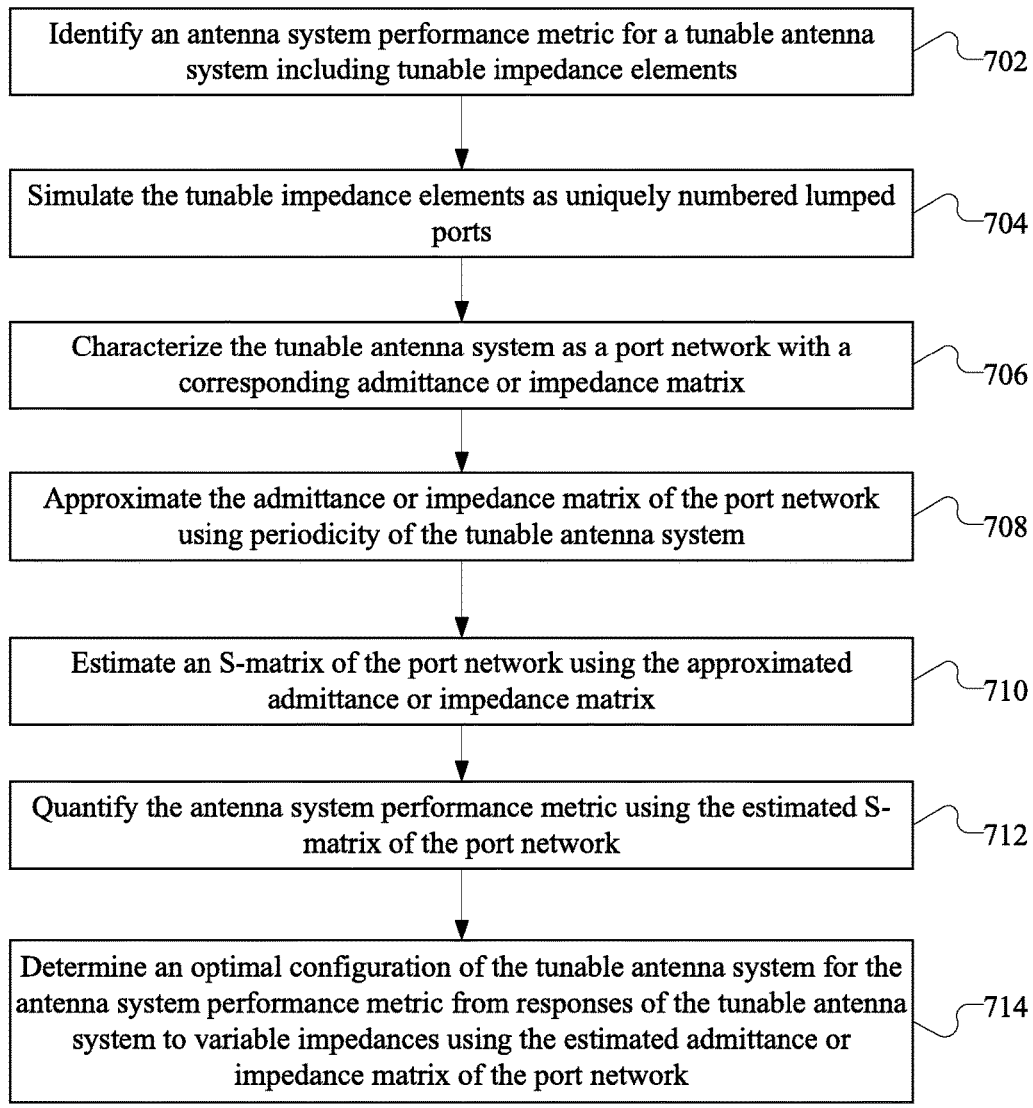

LARGE AREA METAMATERIAL ANTENNA OPTIMIZATION

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc., applications of such applications are also incorporated by reference, including any priority claims made in those applications and any material incorporated by reference, to the extent such subject matter is not inconsistent herewith.

CROSS-REFERENCE TO RELATED APPLICATIONS

The present application claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)).

PRIORITY APPLICATIONS

None.

TECHNICAL FIELD

The present disclosure generally relates to wireless signal transmission, and more particularly, to techniques for optimizing with metamaterial antennas.

BACKGROUND

Advances in modern technology, network connectivity, processing power, convenience, and the like, support an ever increasing number of interconnected devices such as mobile devices, cell phones, tablets, smart-cars, wearable devices, etc. In turn, these advances present new challenges and create new opportunities for network operators and third party service providers to efficiently target, communicate, or otherwise exchange signals between networked devices. Indeed, modern approaches for wireless signal transmission must often account for complex conditions and dynamic factors such as network traffic, signal propagation through various media, spectrum/frequency constraints for signal transmission, and the like.

Recently, metamaterial devices have been developed to transmit and receive signals, in particular for wireless signals. Such metamaterial devices typical employ large arrays of metamaterials that are controlled to achieve desired performance metrics during operation of the metamaterials devices. However, as sizes of arrays of metamaterials integrated into metamaterial devices grow, it becomes more and more difficult to identify optimized configurations of the metamaterial devices. In particular, larger amounts of computational resources and/or time are needed to identify optimal configurations for controlling operation of the metamaterial devices to achieve an antenna system performance metric. There therefore exist needs for improved ways to control operation of metamaterials devices to achieve an antenna system performance metric during operation of the metamaterials devices. In particular, there exist needs for reducing computational resources used to control operation of metamaterials devices to achieve an antenna system performance metric during operation of the metamaterials devices.

This application fully incorporates by reference the content of the following applications: U.S. patent application Ser. No. 15/722,973, filed on Oct. 2, 2017, entitled TIME REVERSAL BEAMFORMING TECHNIQUES WITH METAMATERIAL ANALYSIS; U.S. patent application Ser. No. 15/183,291, filed on Jun. 15, 2016, entitled METHODS AND SYSTEMS FOR COMMUNICATION WITH BEAMFORMING ANTENNAS, and published as U.S. Pat. Pub. No. 2006/0373181; U.S. patent application Ser. No. 15/253,606, filed on Aug. 31, 2016, entitled TUNABLE MEDIUM LINEAR CODER; U.S. patent application Ser. No. 15/409,401, filed on Jan. 18, 2017, entitled TUNABLE MEDIUM LINEAR CODER; U.S. patent application Ser. No. 15/586,157, filed on May 3, 2017, entitled DYNAMIC METAMATERIAL CODED-APERTURE IMAGING; U.S. patent application Ser. No. 15/048,878 filed on Feb. 19, 2016, entitled TRANSMITTER CONFIGURED TO PROVIDE A CHANNEL CAPACITY THAT EXCEEDS A SATURATION CHANNEL CAPACITY, and published as U.S. Pat. Pub. No. 2017/0244454; U.S. patent application Ser. No. 15/048,880 filed on Feb. 19, 2016, entitled RECEIVER CONFIGURED TO PROVIDE A CHANNEL CAPACITY THAT EXCEEDS A SATURATION CHANNEL CAPACITY, and published as U.S. Pat. Pub. No. 2017/0244453; U.S. patent application Ser. No. 15/048,884 filed on Feb. 19, 2016, entitled SYSTEM WITH TRANSMITTER AND RECEIVER REMOTE FROM ONE ANOTHER AND CONFIGURED TO PROVIDE A CHANNEL CAPACITY THAT EXCEEDS A SATURATION CHANNEL CAPACITY, and published as U.S. Pat. Pub. No. 2017/0244450; U.S. patent application Ser. No. 15/048,888 filed on Feb. 19, 2016, entitled SYSTEM WITH TRANSMITTER AND RECEIVER CONFIGURED TO PROVIDE A CHANNEL CAPACITY THAT EXCEEDS A SATURATION CHANNEL CAPACITY, and published as U.S. Pat. Pub. No. 2017/0244455; U.S. patent application Ser. No. 14/918,331, filed on Oct. 20, 2015, entitled TUNABLE METAMATERIAL SYSTEMS AND METHODS, and published as U.S. Pat. Pub. No. 2017/0069966; U.S. patent application Ser. No. 14/986,255, filed on Dec. 31, 2015, entitled WIRELESS POWER TRANSFER USING TUNABLE METAMATERIAL SYSTEMS AND METHODS, and published as U.S. Pat. Pub. No. 2017/0069969; U.S. patent application Ser. No. 14/986,258, filed on Dec. 31, 2015, entitled WIRELESS POWER TRANSFER USING TUNABLE METAMATERIAL SYSTEMS AND METHODS, and published as U.S. Pat. Pub. No. 2017/0069973; U.S. patent application Ser. No. 15/345,251, filed on Nov. 7, 2016, entitled MASSIVELY MULTI-USER MIMO USING SPACE TIME HOLOGRAPHY; and U.S. patent application Ser. No. 15/409,394, filed on Jan. 18, 2017, entitled MASSIVELY MULTI-USER MIMO USING SPACE TIME HOLOGRAPHY.

SUMMARY

In certain embodiments, a method can include identifying an antenna system performance metric for a tunable antenna system with tunable impedance elements. A substantial portion of the tunable antenna system can include a periodic arrangement of geometrically identical unit cells. The tunable impedance elements can be simulated as uniquely numbered lumped ports and the tunable antenna system can be characterized as a port network with a corresponding admittance or impedance matrix. The admittance or impedance matrix for the port network can be approximated using periodicity of the tunable antenna system. Subsequently, an S-matrix of the port network can be estimated using an approximated admittance or impedance matrix of the port network and characteristic impedance values of the lumped ports. The S-matrix can then be used to quantify the antenna system performance metric identified for the tunable antenna system. An optimal configuration of the tunable antenna system with respect to the antenna system performance metric can then be identified from responses of the tunable antenna system to variable impedances using the admittance or impedance matrix of the port network. The optimal configuration of the tunable antenna system can include impedances of the tunable impedance elements modeled as the lumped ports in the port network.

In various embodiments, a tunable antenna system comprises a periodic arrangement of geometrically identical unit cells and tunable impedance elements. The tunable impedance elements can be tuned according to an optimal configuration of the tunable antenna system for an antenna system performance metric. The optimal configuration of the tunable antenna system can be selected by simulating the tunable impedance elements as uniquely numbered lumped ports. Further, the optimal configuration of the tunable antenna system can be selected by characterizing the tunable antenna system as a port network with a corresponding admittance or impedance matrix and approximating the admittance or impedance matrix of the port network using periodicity of the tunable antenna system. An S-matrix of the port network can be estimated using an approximated admittance or impedance matrix of the port network and characteristic impedance values of the lumped ports. The S-matrix can then be used to quantify the antenna system performance metric identified for the tunable antenna system. The optimal configuration of the tunable antenna system with respect to the antenna system performance metric can then be identified from responses of the tunable antenna system to variable impedances using the admittance or impedance matrix of the port network. The optimal configuration of the tunable antenna system can include impedances of the tunable impedance elements modeled as the lumped ports in the port network.

In certain embodiments, a tunable antenna system can include tunable impedance elements and a substantial portion of the tunable antenna system can include a periodic arrangement of geometrically identical unit cells. The tunable antenna system can also include a processor and a computer-readable medium that provides instructions to cause the processor to perform operations for selecting an optimal configuration of the tunable antenna system. Specifically, the processor can identify an antenna system performance metric for the tunable antenna system. The processor can also simulate the tunable impedance elements as uniquely numbered lumped ports. Further, the processor can characterize the tunable antenna system as a port network with a corresponding admittance or impedance matrix and approximate the admittance or impedance matrix of the port network using periodicity of the tunable antenna system. Using the approximated admittance or impedance matrix of the port network and characteristic impedance values of the lumped ports an S-matrix of the port network can be approximated. Subsequently, the processor can use the S-matrix to quantify the antenna system performance metric identified for the tunable antenna system. The optimal configuration of the tunable antenna system with respect to the antenna system performance metric can then be identified, by the processor using the instructions provided by the computer-readable medium, from responses of the tunable antenna system to variable impedances using the admittance or impedance matrix of the port network. The optimal configuration of the tunable antenna system can include impedances of the tunable impedance elements modeled as the lumped ports in the port network.

In various embodiments, a method can include identifying a preliminary structure of a tunable antenna system and identifying an antenna system performance metric for the tunable antenna system. The tunable antenna system can include impedance elements and a substantial portion of the tunable antenna system can include a periodic arrangement of geometrically identical unit cells. Further, the tunable impedance elements can be simulated as uniquely numbered lumped ports and the tunable antenna system can be characterized as a port network with a corresponding admittance or impedance matrix. The admittance or impedance matrix for the port network can be approximated using periodicity of the tunable antenna system. Subsequently, an S-matrix of the port network can be estimated using an approximated admittance or impedance matrix of the port network and characteristic impedance values of the lumped ports. The S-matrix can then be used to quantify the antenna system performance metric identified for the tunable antenna system. An optimal configuration of the tunable antenna system with respect to the antenna system performance metric can then be identified from responses of the tunable antenna system to variable impedances using the admittance or impedance matrix of the port network. The optimal configuration of the tunable antenna system can include impedances of the tunable impedance elements modeled as the lumped ports in the port network. The method can include identifying global limits for the antenna system performance metric using global optimization of the tunable impedance elements. Subsequently, the preliminary structure and the optimal configuration of the tunable antenna system can be accepted if the global limits of the antenna system performance metric exceed desirable threshold performance metrics of the tunable antenna system.

BRIEF DESCRIPTION OF THE DRAWINGS

The embodiments herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a flowchart of an example method of determining an optimal configuration of a tunable antenna system for one or more antenna system performance metrics;

DETAILED DESCRIPTION

Figure 1:
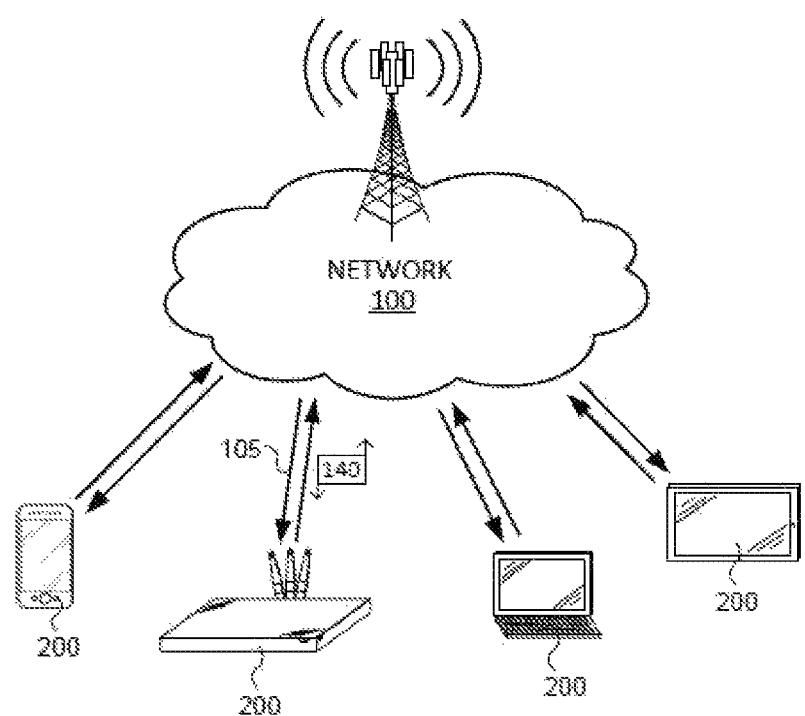
FIG. 1 illustrates a schematic block diagram of an example communication network.

The subject disclosure describes improved techniques for configuring operation of metamaterial antennas, metamaterial devices, or other applicable tunable antenna systems. More specifically, the subject disclosure described improved techniques for identifying an optimal configuration and subsequently configuring tunable antenna systems to operate according to the optimal configuration to transmit and receive wireless signals, e.g. to beamform wireless signals. Notably, the techniques disclosed herein may be employed in a variety of applications such as wireless communications, heating, wireless power transmission, far field directed beams, 3D tomography, RADAR, and the like. While certain applications are discussed in greater detail herein, such discussion is for purposes of explanation, not limitation.

For example, many of the above mentioned applications can be employed in a communication network environment. In this context, a communication network is a geographically distributed collection of devices or nodes interconnected by communication links and segments for transporting data between end nodes or terminal devices, such as computers, workstations, mobile devices, sensors, and so on. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

Some of the infrastructure that can be used with embodiments disclosed herein is already available, such as general-purpose computers, RF antennas, computer programming tools and techniques, digital storage media, and communications networks. A computing device may include a processor such as a microprocessor, microcontroller, logic circuitry, or the like. The processor may include a special purpose processing device such as an ASIC, PAL, PLA, PLD, FPGA, or other customized or programmable device. The computing device may also include a computer-readable storage device such as non-volatile memory, static RAM, dynamic RAM, ROM, CD-ROM, disk, tape, magnetic, optical, flash memory, or other computer-readable storage medium.

Various aspects of certain embodiments may be implemented using hardware, software, firmware, or a combination thereof. As used herein, a software module or component may include any type of computer instruction or computer executable code located within or on a computer-readable storage medium. A software module may, for instance, comprise one or more physical or logical blocks of computer instructions, which may be organized as a routine, program, object, component, data structure, etc., that performs one or more tasks or implements particular abstract data types.

In certain embodiments, a particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Furthermore, the features, structures, and operations associated with one embodiment may be applicable to or combined with the features, structures, or operations described in conjunction with another embodiment. In other instances, well-known structures, materials, or operations are not shown or described in detail to avoid obscuring aspects of this disclosure.

Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once.

FIG. 1 illustrates a schematic block diagram of an example communication network 100 comprising various nodes/devices 200 (described in greater detail with respect to FIG. 2 below) interconnected by one or more links 105, which represent various methods of communication. For instance, links 105 may be wired links or shared media (e.g., wireless links, PLC links, etc.) where certain nodes 200, such as, e.g., routers, sensors, base stations, user equipment, etc., may be in communication with other nodes 200 based on distance, signal strength, current operational status, location, etc.

Signals 140 represent traffic and/or messages (e.g., data packets) sent between the devices/nodes over communication network 100 using predefined network communication protocols such as certain known wired protocols, wireless protocols (e.g., IEEE Std. 802.15.4, Wi-Fi®, Bluetooth®, etc.), PLC protocols, or other shared-media protocols where appropriate. In this context, a protocol consists of a set of rules defining how the nodes interact with each other. Moreover, signals 140 may represent wireless signals which are transmitted according to the improved beamforming techniques described herein.

Those skilled in the art will understand that any number of nodes, devices, links, etc. may be used in the computer network, and that the view shown herein is for simplicity. Also, those skilled in the art will further understand that while network 100 is shown with the nodes/devices connected to the network, such network is merely an example illustration that is not meant to limit the disclosure.

Figure 2:
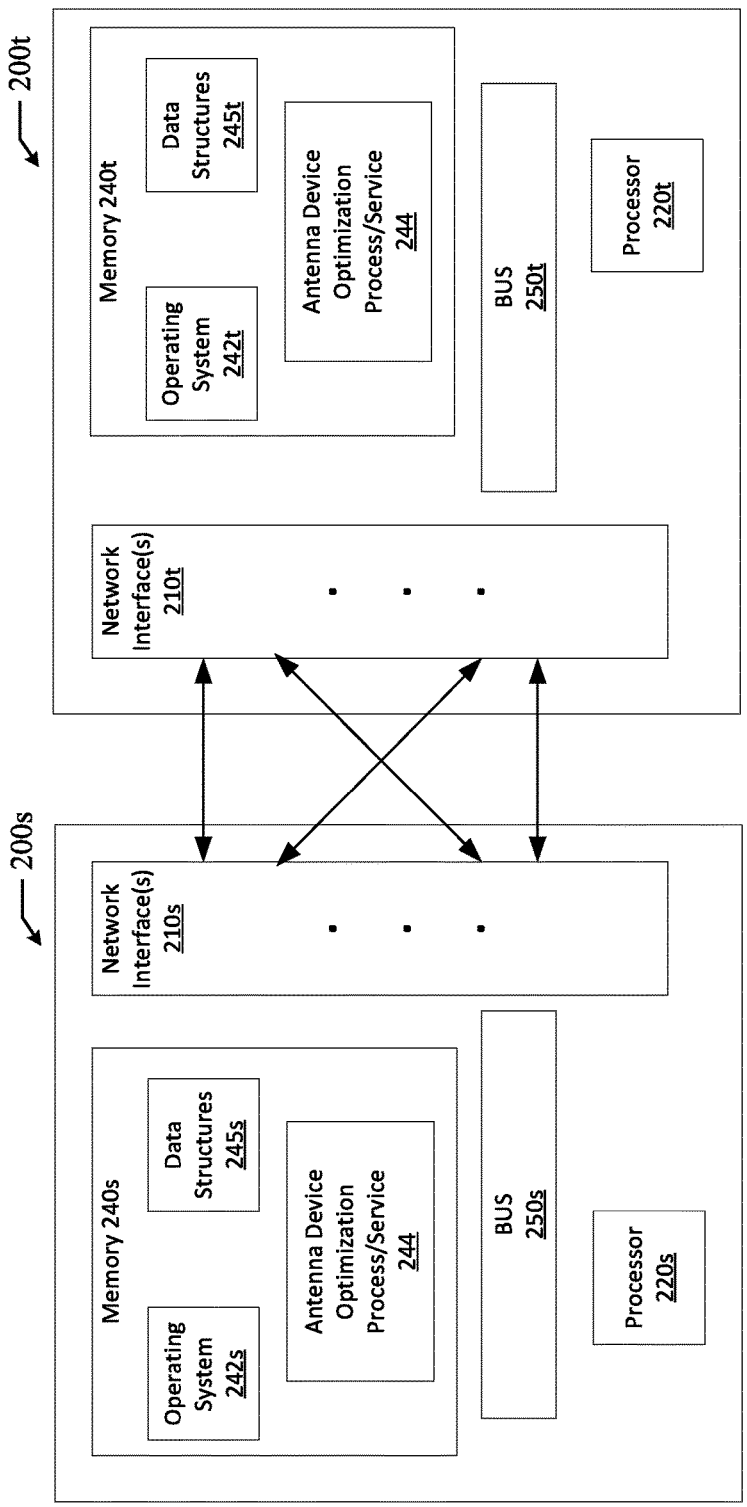
FIG. 2 illustrates a schematic block diagram of example network devices/nodes, including a source device and a target device.

FIG. 2 illustrates a schematic block diagram of example network devices/nodes that communicate over a communication network, such as communication network 100. As shown, the example network devices include a source device 200s, which represents a base station, and a target device 200t, which represents user equipment (UE). As mentioned above, although the illustrated devices are shown as configured for operations in specific environments, such devices are shown for purposes of discussion, not limitation, and further, it is appreciated the improved beamforming techniques described herein may be employed by any number of devices operating in a variety of environments, as is appreciated by those skilled in the art.

Source device 200s and target device 200t comprise similar and/or complimentary hardware/software components that support signal exchanges over network 100. As shown, source device 200s and target device 200t includes one or more network interfaces 210s/210t, at least one processor 220s/220t, and a memory 240s/240t interconnected by a system bus 250s/250t.

Network interface(s) 210s/210t contain the mechanical, electrical, and signaling circuitry for communicating data over links coupled to communication network 100. For example, network interfaces 210s/210t may be configured to transmit and/or receive data using a variety of different communication protocols, as will be understood by those skilled in the art. As shown, network interfaces 210s include a metamaterial components such as metamaterial antennas, tunable metamaterial elements (e.g., coders), and so on. As shown here, the metamaterial components of network interfaces 210s are represented by an array of sub-wavelength antenna elements associated with variable lumped impedance elements, as will be discussed in greater detail below.

Memory 240s/240t comprises a plurality of storage locations such as data structures 245s/245t, which are addressable by processor 220s/220t. In this fashion, processor 220s/220t comprises necessary elements or logic adapted to execute the software programs and manipulate data structures 245/245t.

An operating system 242s/242t, portions of which are typically resident in memory 240s/240t (and executed by processor 220s/220t), functionally organizes respective devices by, inter alia, invoking operations in support of software processes and/or services executing on the device. For example, these software processes and/or services include operations to support multiple-input multiple-output (MIMO) communications, encoding/decoding symbols, spatial processing (e.g., precoding symbols, etc.), modulating, de-modulating, converting, amplifying, filtering, and so on.

In addition, memory 240s of source device 200s includes an illustrative antenna device optimization process/service 244, which can be used to configure an antenna device, such as the source device 200s and/or the target device 200t, (e.g., antenna, tunable metamaterial elements (e.g., coders, etc.), and other applicable tunable elements. Note that while process 244 is shown in centralized memory 240s, some embodiments employ process 244 over distributed network of devices, to send and receive wireless transmissions. In particular the antenna device optimization process/service 244 can configure an antenna device by changing impedances of tunable impedance elements included as part of the antenna device. For example, the antenna device optimization process/service 244 can identify and set impedance levels of impedance elements of an antenna device to configure the device to transmit wireless signals at a specific or otherwise desired strength level in a specific direction.

The antenna device optimization process/service 244 can configure a tunable antenna device to operate according to one or more antenna system performance metrics. Antenna system performance metrics can include applicable performance metrics of an antenna device in operating to transmit and receive wireless signals. For example, antenna system performance metrics can include metrics related to steering a transmitted wireless signal, receiving a steered wireless signal, and beamforming a transmitted wireless signal.

With reference to the beamforming operations discussed herein, the antenna device optimization process/service 244 can employ a time reversal beamforming process that exploits reciprocity (or time-invariance) for electromagnetic propagation channels that are not "polluted" by non-time-invariant components. For example, target device 200t can temporarily transmits signals (e.g., reference signals) that are received by source device 200s. However, network interfaces 210s can include metamaterial components which do not support direct amplitude measurements of the reference signals. Instead, the antenna device optimization process/service 244 can include instructions that cause the source device 200s to modulate an impedance of network interfaces 210s (e.g., metamaterial components) to receive the reference signals over a sequence of tuning vectors. Subsequently, the tuning vectors can be used to modulate impedances of the network interfaces to achieve an optimal configuration of a tunable antenna system.

Source device 200s can determine field amplitudes for an array of reference points (e.g., virtual reference ports) that circumscribe at least a portion of the source device based on reference signal amplitudes for each tuning vector. For example, the array of reference points may define a surface that circumscribes the antenna based on a Nyquist sampling rate of one reference point per $(\lambda/2)^2$. In addition, source device 200s can further determine a target tuning vector, e.g. corresponding to an optimal configuration of a tunable antenna system, which defines a target radiation pattern based on the field amplitudes for the array of reference points and transmits a target signal from the source device to a target device based on the target radiation pattern. In this fashion, the antenna device optimization process/service 244 can facilitate beamforming signals (e.g., wireless power signals, communication signals, energy beams, etc.) for devices having metamaterial components. These and other features are described in greater detail below.

Notably, various processor and memory types, including computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220s/220t can include one or more programmable processors, e.g., microprocessors or microcontrollers, or fixed-logic processors. In the case of a programmable processor, any associated memory, e.g., memory 240s/240t, may be any type of tangible processor readable memory, e.g., random access, read-only, etc., that is encoded with or stores instructions that can implement program modules thereon. Processor 220s/220t can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform functions described herein.

Figure 3:
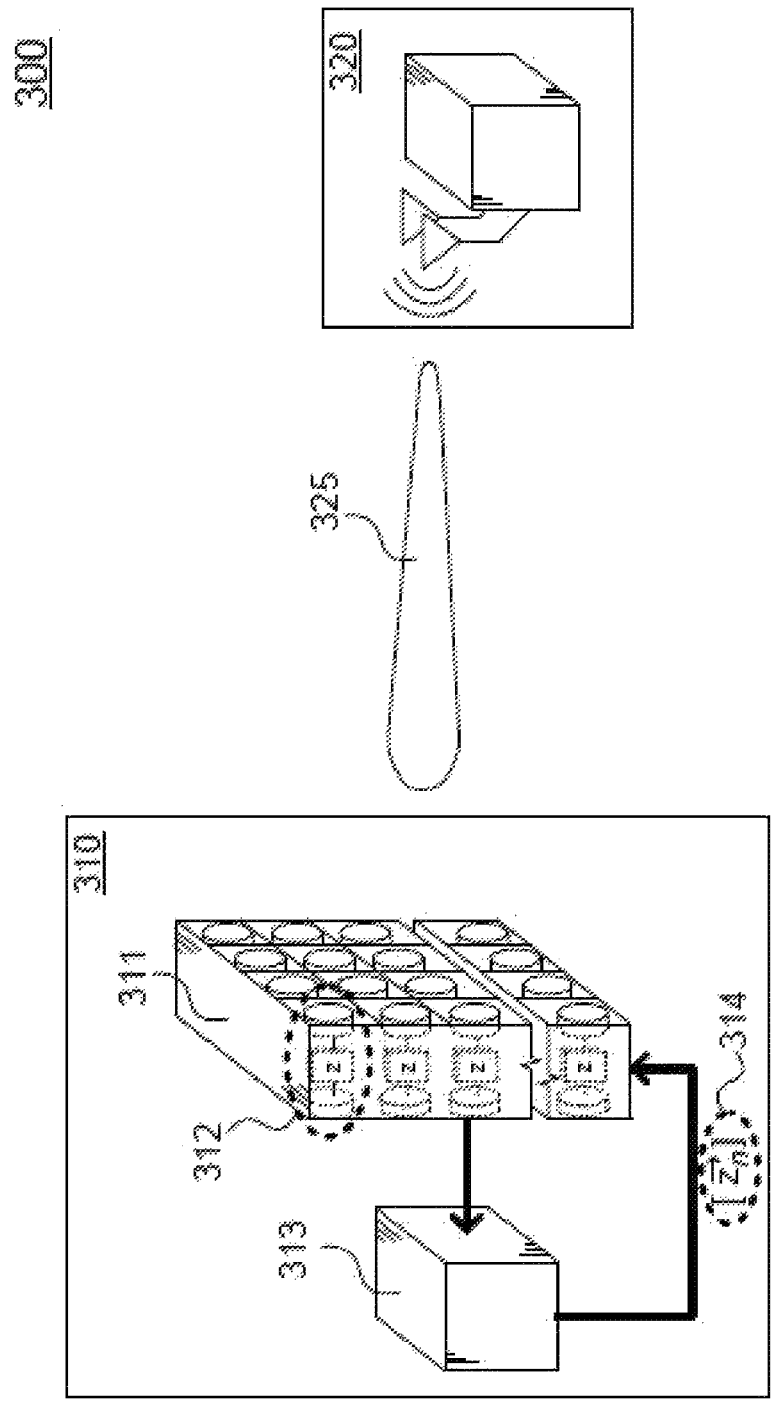
FIG. 3 illustrates a schematic block diagram of communications between a source device and a target device, showing the target device transmitting a reference signal to the source device.

FIG. 3 illustrates a schematic block diagram 300 of communications between a source device 310 and a target device 320. In the block diagram 300, a target device 320 can transmit a reference signal 325 to a source device 310 over a network such as the communication network 100 shown in FIG. 1.

The source device 310 includes a network interface or antenna 311, comprising an array of metamaterial elements 312. Metamaterial elements 312 can be tunable two-dimensional meta-surface objects, where each metamaterial element 312 forms a "unit cell" that may be mapped and/or modeled as a port "$N_a$" (e.g., a lumped port, a wave port, etc.) having respective lumped impedance elements "z". Metamaterial elements 312 can include, for example, resistors, capacitors, inductors, varactors, diodes, transistors, alternative circuit components (e.g., discrete or integrated), and the like, as is appreciated by those skilled in the art.

Moreover, metamaterial elements 312 can be passive, active, or variably passive-active and, for a given frequency, the respective impedance element z may be described by a complex value. In this fashion, a positive integer may be used to describe a portion of the tunable impedance values for the metamaterial elements 312. Alternatively, (or in addition), tunable impedance values for respective impedance elements may be described by complex vector, $[\vec{z}_n]$. Although metamaterial components 312 are represented by respective one lumped impedance elements, it is also appreciated antenna 311 can include a common transmission line (TL) or wave guide (not shown) coupled to one or more metamaterial components 312 via the lumped impedance elements.

Preferably, metamaterial components 312 form sub-wavelength antenna elements with inter-element spacing that is substantially less than a free-space wavelength for an operating frequency or frequency range of antenna 311. For example, the inter-element spacing may be less than one-half or one-quarter of the free-space operating wavelength or frequency, which can include, but is not limited to microwave frequencies, very low frequencies, low frequencies, medium frequencies, high frequencies, very high frequencies, ultra-high frequencies, super-high frequencies, and extremely high frequencies or millimeter waves.

In operation, target device 320 transmits or radiates reference signal 325 at an arbitrary (but sufficient) power level to reach source device 310. Source device 310 receives reference signal 325 over a sequence of tuning vectors. For example, a controller 313 (e.g., a processor such as processor 220s) effectively "tunes" antenna 311 to different frequencies by adjusting impedance values for one more metamaterial components 312, individually or collectively using on control input(s) 314 that correspond to impedance values. In this fashion, controller 313 tunes antenna 311 to receive reference signal 325 over the sequence of tuning vectors. Put differently, target device 320 continuously transmits reference signal 325 while source device 310 is tuned to each impedance value and/or the sequence of tuning vectors of control inputs 314, described in greater detail below.

Notably, tuning may be a one-time static operation performed during the manufacturing of antenna 311, or tuning may be a dynamic process controlled by the one or more control inputs. Here, metamaterial components 312 can be dynamically manipulated in real-time to receive signals over a wide range of frequencies as well as to transmit or radiate signals over a wide range radiation patterns. The number of metamaterial components 312, associated impedance elements "z", and the number of impedance control inputs may be a 1:1:1 ratio or an X:Y:Z, where X, Y, and Z are integers that may or may not be equal. For instance, in one embodiment there may be a 1:1 mapping of impedance elements to sub-wavelength antenna elements while there is only one-tenth the number of impedance control inputs.

Figure 4:
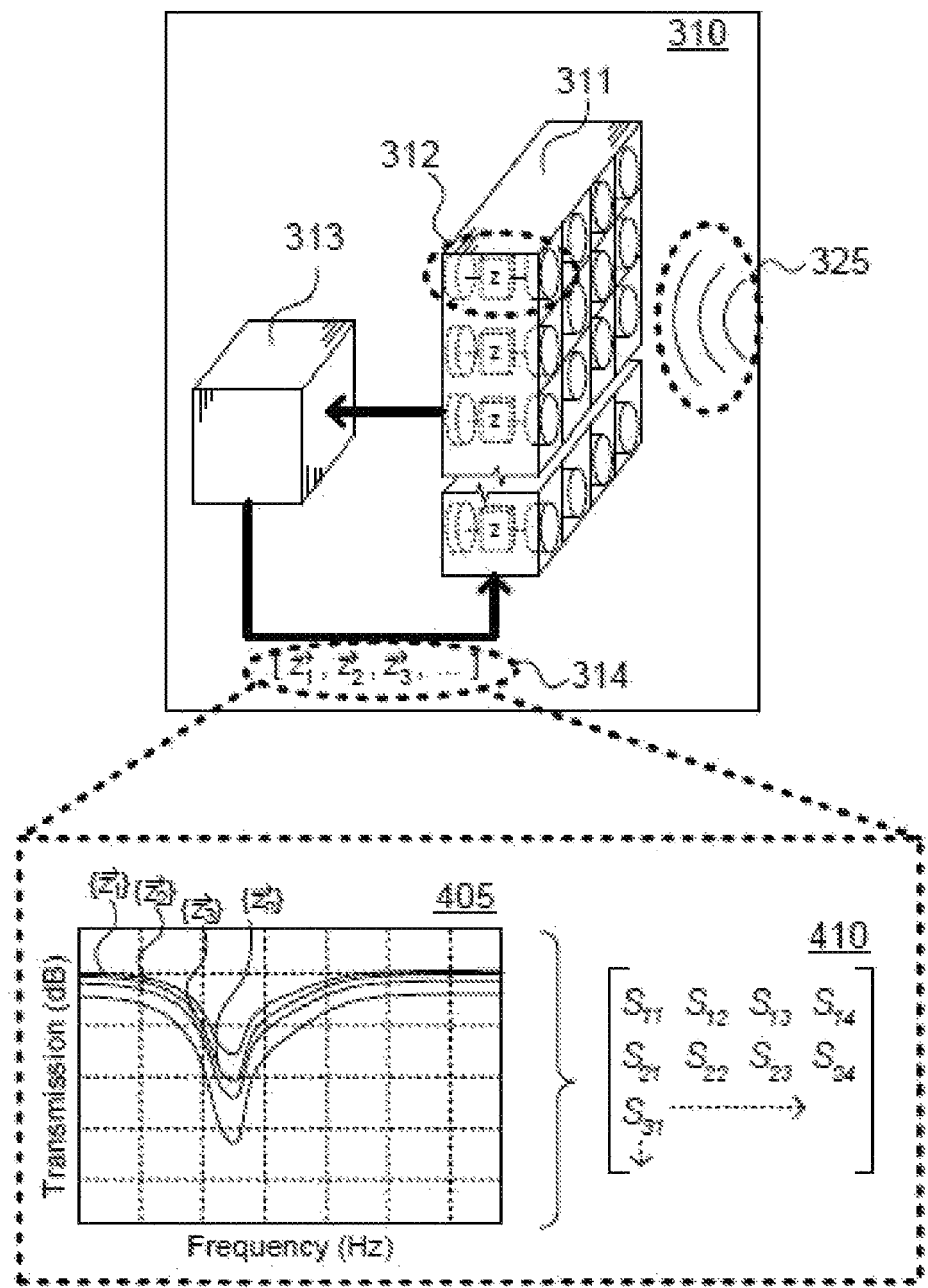
FIG. 4 illustrates a schematic block diagram of an antenna of the source device shown in FIG. 3, showing metamaterial components of the antenna tuned to receive the reference signal over a sequence of tuning vectors.

FIG. 4 illustrates a schematic block diagram of antenna 311, showing metamaterial components 312 tuned according to an optimal configuration of a tunable antenna system to receive reference signal 325 over the sequence of tuning vectors of control inputs 314. Here, source device 310 measures reference signal amplitudes or field amplitudes for tuning vectors and for ports ($N_a$) mapped to respective metamaterial components 312. In turn, these field amplitudes define, in part, radiation patterns for received reference signals over a sequence of tuning vectors $[\vec{z}_n]$ for a frequency range. Notably, the simplest measurements may be represented by an antenna having one input/output port ($N_{i/o}=1$), with a signal amplitude measurement for each impedance vector, however it is also appreciated any the antenna may have any number of input/output ports. Impedance vectors can correspond to characteristic impedance values, e.g. of ports or lumped ports, which can subsequently be used to identify an optimal configuration of a tunable antenna system. These reference signal amplitudes are represented by a signal amplitude graph 405 and can be used, in part, to estimate a corresponding scattering matrix (S-matrix) 410.

S-matrix 410 comprises scattering parameters $S_N$, which represent a complex magnitude of field (e.g., electric field) at a particular location in space, given by a radius vector $\vec{r}_0$, normalized to the field magnitude at a corresponding antenna port. An absolute value $|S_N|$, or an algebraically convenient quantity $|S_{1N}|^2$, quantifies the quality of field concentration at a given point (e.g., antenna ports $N_a$, which are mapped to respective metamaterials components 312). Identifying the S-matrix 410 can be very difficult and consume large amounts of time and computational resources for large numbers of metamaterial components 312 forming large area arrays. Accordingly, as will be discussed in greater detail later, the S-matrix 410 can be estimated, e.g. based ultimately on the periodic nature of the metamaterial components 312 and corresponding lumped ports, in order to reduce computational resources and time used to identify the S-matrix 410. More specifically, the S-matrix 410 can be estimated using an estimated admittance or impedance matrix, that is estimated to reduce computational resources and time used to identify the admittance or impedance matrix. This, in turn, can allow for easier control and fabrication of tunable antenna systems in order to meet one or more desired antenna performance system metrics for the tunable antenna systems. More specifically, tunable antenna systems with large arrays of metamaterial elements can be modeled and subsequently designed and controlled under current operational and design constraints.

In operation, source device 310 tunes antenna 311 based on a sequence of tuning vectors $[\vec{z}_n]$, where the tuning vectors adjust impedance values (z) for corresponding metamaterial components 312. The tuning vectors include $N_{mod}$ vectors, where each tuning vector $\vec{z}$ is defined, in part, by a length $N_{tun}$. The tuning vectors may be predefined, selected from a list of options, and/or determined dynamically based on additional measurements performed by source device 310, as is appreciated by those skilled in the art.

Source device 310 can further compute or estimate scattering or S-parameters for the S-matrix 410, based on a model of antenna ports, $N_a$ (e.g., a lumped port model, a wave port model, etc.), an impedance matrix (Z-matrix) of known impedance values for tuning vectors $[\vec{z}_n]$, and an admittance matrix (Y-matrix) of admittance parameters, where the Y-matrix is an equivalent inverse matrix of the Z-matrix such that $Y=Z^{-1}$.

The S-Matrix may be expressed by a relationship between the Z or Y matrices and the values of the impedance elements as follows:

$$S=(\sqrt{y}Z\sqrt{y}-1)(\sqrt{y}Z\sqrt{y}+1)^{-1}=(1-\sqrt{z}Y\sqrt{z})(1+\sqrt{z}Y\sqrt{z})^{-1}$$

Where "1" represents a unit matrix of size N.

Notably, impedance values for the Z-matrix and scattering parameters for the Y-matrix are typically defined in terms of $Z_{nm}=V_n/I_m$, where $V_n$ and $I_m$ represent a voltage at antenna port "n" and a current at port "m", measured with all other ports open. That is, assuming port currents $I_k=0$ for all k not equal to m or n. Similarly, for the Y-Matrix, $Y_{nm}=I_m/V_n$, measured with all other ports open. Again, that is assuming port currents $I_k=0$ for all k not equal to m or n.

The S-matrix 410 can represent port-to-port transmission of off-diagonal elements in an N-port antenna such as antenna 311. In a lossless system, the S-matrix is necessarily unitary. If elements $S_n$ are singular values of the S-matrix, which are the same as the magnitudes of the eigenvalues, it can be stated that in a lossless system, all $S_n=1$. In general, if $S_{max}$ is the largest singular value, then for a passive lossy system it can be stated that $S_n \leq S_{max} \leq 1$.

In an active system, these bounds still hold, however $S_{max}$ can now exceed unity, representing an overall power gain for at least one propagation path. The Z and Y matrices are diagonal in the same basis represented by a unitary matrix:

$$U(U^\dagger=U^{-1}), \text{ such that } Z=U^\dagger Z_d U, Y=U^\dagger Y_d U$$

Where "d" indicates a diagonal matrix comprising complex-valued eigenvalues.

In general, unless $\sqrt{z}$ is proportional to a unit matrix, i.e., all lumped element impedances are equal, the S-Matrix will not be diagonal in the U-basis. In the U-basis, the general form of the S-Matrix is:

$$S=U^\dagger(1-\zeta Y_d \zeta)(1+\zeta Y_d \zeta)^{-1}U$$

Where a new non-diagonal matrix $\zeta=U\sqrt{z}U^\dagger$ is used such that:

$$\sqrt{z}=U^\dagger \zeta U$$

Where $Y_d$ is diagonal (though not generally commutative with $\zeta$).

The S-matrix can be numerically evaluated with any desired accuracy by solving N linear system problems, e.g., $Z_{nm}=V_n/I_m$ or $Y_{nm}=I_m/V_n$, and the associated open port conditions described above. Such problems may be solved with Finite Element Methods (FEM) or finite-difference time-domain (FDTD) based solvers for linear electromagnetic systems. Examples of commercially available solvers include ANSYS HFSS, COMSOL, and CST. These numerical simulations incorporate various fine effects of the near-field and far-field interactions between various parts of the system, regardless of complexity.

The impedance values of the Z-matrix may also be mapped to scattering parameters of the S-matrix by a non-linear mapping. In some instances, this mapping may be expressible as a single- or multivariate polynomial. The polynomial may be of a relatively low order (e.g., 1-5). The S-matrix may comprise N values and the Z-matrix may comprise M values, where N and M are both integers and equal to one another, such that there is a 1:1 mapping of S-matrix values and Z-matrix values. Any of a wide variety of mapping is possible. For example, the S-matrix may comprise N values and the Z-matrix may comprise M values, where N squared is equal to M. Alternatively, there may be a 2:1 or 3:1 mapping or a 1:3 or 2:1 mapping.

Figure 5:
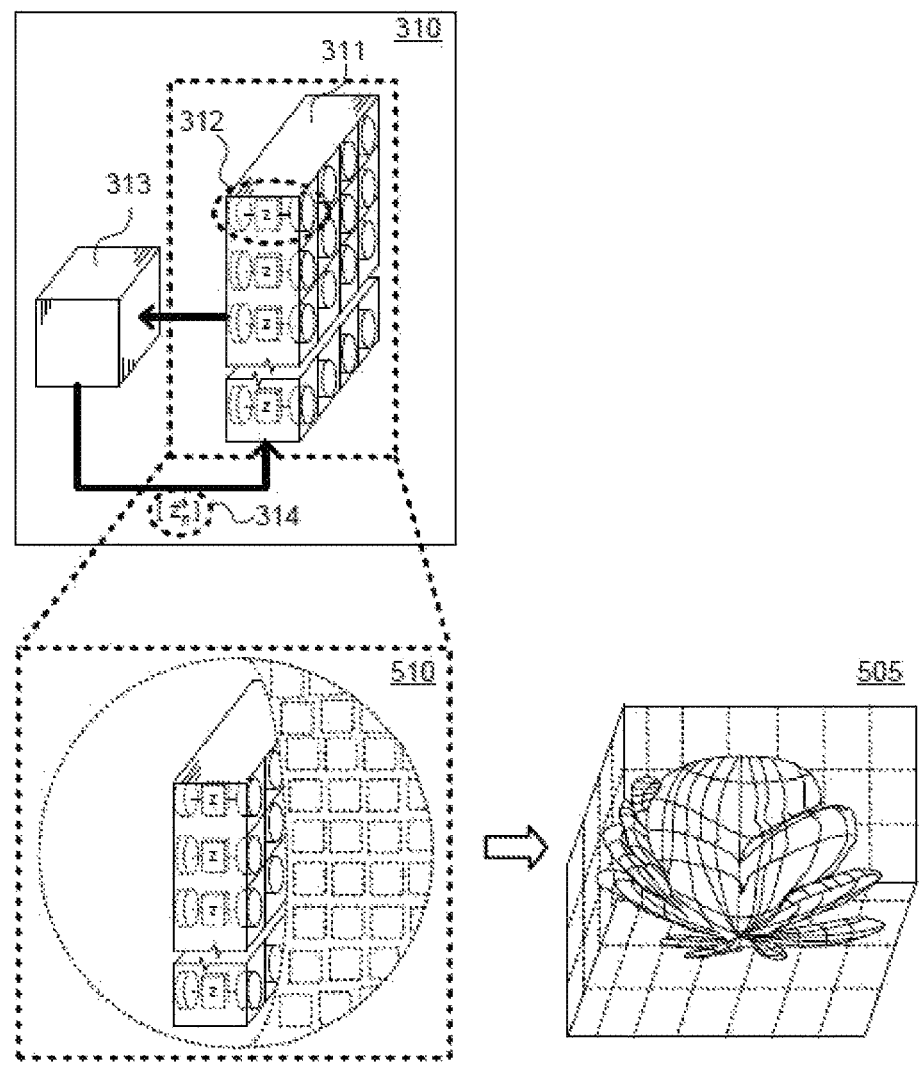
FIG. 5 illustrates a schematic block diagram of an array of reference points or virtual ports circumscribing at least a portion of the antenna of the source device shown in FIG. 3.

FIG. 5 illustrates a schematic block diagram of an array of reference points or virtual ports 510 that circumscribe at least a portion of antenna 311. Here, virtual ports 510 define a surface that covers a transmission aperture of antenna 311. As mentioned above, these virtual ports 510 can be defined and spaced about the transmission aperture based on a Nyquist sampling rate of one reference point per $(\lambda/2)^2$.

Virtual ports 510 represent probes or field sampling points that can conceptually quantify field intensities (e.g., complex field amplitudes), represented by an electromagnetic field graph 505, at a particular location. Each virtual port may be assumed infinitesimal in area and/or volume and located at a particular radius-vector $\vec{r}_0$. relative to antenna 311 and/or metamaterial components 312. Preferably, virtual ports 510 are positioned or defined at a Nyquist spatial resolution (half-wavelength) or denser and should surround or substantially surround a transmit aperture of antenna 311 in order to provide sufficient samples for a given electromagnetic field. As discussed in greater detail herein, the field intensities can be calculated for each reference point or virtual port 510, which field intensities are used to determine a desired radiating pattern for a target signal using an optimal tunable antenna system configuration.

In operation, source device 310 can compute or estimate S-parameters based on known or approximated Z-matrix values as well as known tunable impedance vectors (which can correspond to characteristic impedance values describing its tunable elements), as discussed above. For example, computing a complex field amplitude at an $i^{th}$ virtual port, which is implied to represent the field value at the corresponding reference point collocated with that virtual port, may be described by the following equation:

$$E_i = S_{i,o} * E_o$$

Where $S_{i,o}$ represents a known component of the S-matrix (computed from the known/approximated Z-matrix of the antenna and the known values tunable impedance vector), $E_o$ is the complex amplitude measured at an output port, and $E_i$ is the complex amplitude at the i-th virtual port, which is implied to represent the field value or field intensity at the corresponding reference point collocated with that virtual port.

Here, $E_o$ is measured, $S_{i,o}$ (S-parameters/S-matrix elements) are computed. In this fashion, the measured complex amplitudes are combined with the computed S-matrix values to yield field amplitudes at virtual ports where measurements didn't actually happen (e.g., $i^{th}$ virtual ports).

Notably, the number of virtual ports 510 corresponds, in part, to a number of tuning vectors ($N_{mod}$). For example, if the number of virtual ports is represented by $N_{fs}$, for $N_{i/o}=1$, then $N_{mod}=N_{fs}$ or greater to ensure the number of reference points (e.g., data points) are greater than a number of unknowns to be determined ($N_{fs}$).

Here, the field amplitudes at the virtual ports correspond to an electromagnetic radiation or field pattern represented by graph 505. These field amplitudes are further used to determine a desired impedance vector for generating a target signal. That is, source device 310 tunes antenna 311 based on the desired impedance vector $[\vec{z}_n]$ to reproduce the reference signal 325 as a target signal (e.g., a phase conjugate signal), as is appreciated by those skilled in the art.

Figure 6:
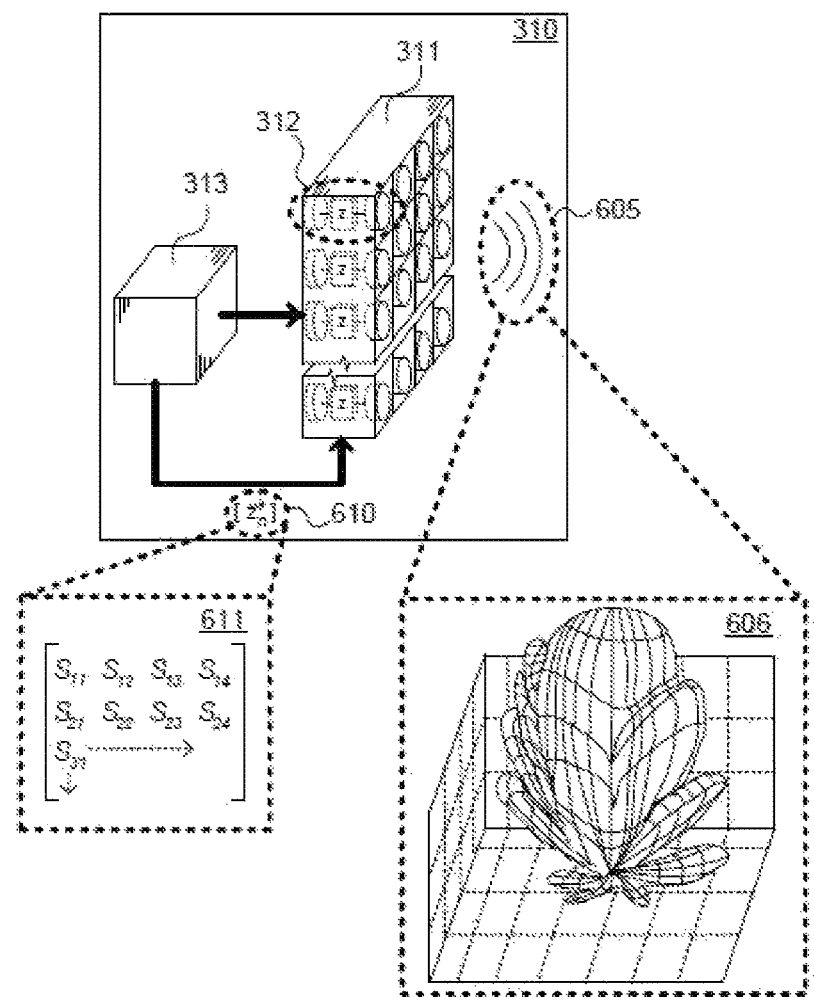
FIG. 6 illustrates a schematic block diagram of the antenna of the source device shown in FIG. 3, showing metamaterial components of the antenna tuned to generate a target signal based on a target tuning vector.

FIG. 6 illustrates a schematic block diagram of source device 310, showing metamaterial components 312 of antenna 311 tuned to generate a target signal 605 based on one or more target tuning vector corresponding to an optimal configuration of a tunable antenna system, represented by control inputs 610 as well as a corresponding S-matrix 611.

As mentioned above, source device 310 determines a desired radiating pattern for an optimal configuration—here, the radiation pattern shown in electromagnetic field graph 606—for target signal 605 based on the complex amplitudes of the fields measured at virtual ports 510. In particular, source device 310 determines a phase-conjugate of reference signal 325, resulting in target signal 605.

In order to generate target signal 605, source device 310 determines a target tuning vector or an optimized impedance vector $[\vec{z}_n]$ that maximizes power at a given antenna port ($N_a$), which antenna port is mapped to corresponding metamaterial components 312. This optimized impedance vector results in S-parameters for an S-matrix 611 that approximates the target field amplitude for each antenna port $N_a$ for a given operating frequency. For example, source device 310 may employ least-squares optimization or other techniques determine the optimal impedance vector that would lead to complex field amplitudes at the field-sampling ports (NO being as close as possible to their desired values.

Typically, source device 310 may determine the optimal impedance vector by calculating an optimized Z-matrix using one or more of a variety of mathematical optimization techniques. For example, the optimal impedance vector may be calculated by finding an optimized Z-matrix based: on an optimization of complex impedance values $z_n$, an optimization of roots of complex values of the impedance values $z_n$, an optimization of reactances associated with the impedance values of the impedance values $z_n$, and/or an optimization of resistivities associated with the impedance values of the impedance values $z_n$. In some embodiments, optimization may be constrained to allow only positive or inductive values of reactances, or only negative or capacitive values of reactances, and/or constrained to only allow for positive or passive values of resistivities.

In addition, the optimal impedance vector corresponding to an optimal configuration of a tunable antenna system may be determined using a global optimization method involving a stochastic optimization method, a genetic optimization algorithm, a Monte-Carlo optimization method, a gradient-assisted optimization method, a simulated annealing optimization algorithm, a particle swarm optimization algorithm, a pattern search optimization method, a multistart algorithm, and/or a global search optimization algorithm. Determining the optimal impedance vector may be at least partially based on one or more initial guesses. Depending on the optimization algorithm used, the optimized values may be local optimizations based on initial guesses and may not in fact be true global optimizations. In other embodiments, sufficient optimization calculations are performed to ensure that a true globally optimized value is identified. In some embodiments, a returned optimization value or set of values may be associated with a confidence level or confidence value that the returned optimization value or set of values corresponds to global extrema as opposed to local extrema. In some embodiments, a Hessian matrix calculation may be utilized that is calculated analytically using an equation relating the S-parameter to the Z-matrix and the optimal impedance vector. In the context of optimization, the Hessian matrix may be considered a matrix of second derivatives of the scalar optimization goal function with respect to the optimization variable vector. A quasi-Newton method may also be employed in some embodiments. In some embodiments, the optimization method may include exhaustively or almost exhaustively determining local extrema by solving a multivariate polynomial equation and selecting a global extrema from the determined local extrema. Alternative gradient-based methods may be used, such as conjugate gradient (CG) methods and steepest descent methods, etc. In the context of optimization, a gradient may be a vector of derivatives of the scalar optimization goal function with respect to the vector of optimization variables. These and other methods may be used determine the optimal impedance vector, as is appreciated by those skilled in the art.

Still referring to FIG. 6, S-matrix 611 comprises elements $S_N$ that represent complex field magnitudes at antenna ports $N_a$ (mapped to respective metamaterial components 312), and is given by the radius vector $\sqrt{r_0}$, normalized to the field magnitude at the port. An absolute value $|S_N|$, or the more algebraically convenient quantity $|S_N|^2$, quantifies the quality of field concentration at that point. Maximizing this quantity (or minimizing in the case of forming nulls) represents a generalized beamforming algorithm, as is appreciated by those skilled in the art.

Notably, when there is only one i/o port in the Tx, a simplified alternative algorithm can be run instead of 2d. Using reciprocity, the Tx is analyzed in receive mode. In this situation, the optimum impedance vector represents a vector that maximizes power at the i/o port, given the complex amplitudes at the field-sampling ports ($N_{fs}$). This is substantially simpler (single-optimization-goal) inverse problem to solve, in comparison with the multi-goal problem (or weighted sum of goals).

As mentioned, source device 310 can adjust impedance values to achieve the optimized impedance vector $[\vec{z}_n]$ corresponding to an optimal configuration of a tunable antenna system using control inputs 610. In this fashion, source device 310 tunes antenna 311 (and/or metamaterial components 312) to generate target signal 605. Control inputs 314 may include various types of control signals (e.g., direct current signals, alternating current signals, pulse width modulated signals, optical signals, thermal conduction signals, etc.), as is appreciated by those skilled in the art.

Further, depending on manufacturing techniques (e.g., 3D printing) values for the optimum impedance vector may translate trivially into the choices made for the selectable impedance elements mapped to corresponding metamaterial elements 312. In some embodiments, impedance elements are dynamically adjustable, variable, or tunable such that there is a non-trivial relationship between the complex impedance of the elements and the stimuli that control them. In these embodiments, the relationship between the complex impedance of the impedance elements and the control inputs may be based on a magnitude of an applied signal, as is appreciated by those skilled in the art.

FIG. 7 is a flowchart 700 of an example method of determining an optimal configuration of a tunable antenna system for one or more antenna system performance metrics. An optimal configuration of a tunable antenna system can include a configuration of a tunable antenna system in operation. More specifically, an optimal configuration of a tunable antenna system can include characteristics and values of configurable parameters of a tunable antenna system to control operation of the tunable antenna system. Configurable parameters of a tunable antenna system include applicable parameters of the tunable antenna system capable of being set or adjusted to control operation of the tunable antenna system. Specifically, configurable parameters can include variable electrical characteristics of elements of a tunable antenna system, variable mechanical characteristics of elements of a tunable antenna system, and variable physical characteristics of elements of a tunable antenna system. For example, configurable parameters of a tunable antenna system can include varying impedance levels of metamaterial elements modeled as lumped ports in a tunable antenna system. In another example, configurable parameters of a tunable antenna system can include varying shapes of metamaterial elements in a tunable antenna system.

An optimal configuration of a tunable antenna system can include a configuration of the tunable antenna system operating to transmit a signal, e.g. a wireless signal. For example, an optimal configuration of a tunable antenna system can include impedance values of metamaterial elements of the tunable antenna system to control beamforming of a wireless signal transmitted by the tunable antenna system. Further, an optimal configuration of a tunable antenna system can include a configuration of the tunable antenna system operating to receive a signal, e.g. a wireless signal. For example, an optimal configuration of a tunable antenna system can include impedance values of metamaterial elements to cause the tunable antenna system to receive a steered wireless signal.

The flowchart 700 begins at step 702, where an antenna system performance metric for a tunable antenna system including tunable impedance elements is identified. An antenna system performance metric can include an applicable desirable or otherwise wanted metric for a tunable antenna system to meet during operation. An antenna system performance metric can include a performance metric for a tunable antenna system operating to transmit a signal, e.g. a wireless signal. For example, an antenna system performance metric can include transmitting wireless signals at specific modulated amplitudes and phases. Further, an antenna system performance metric can include a performance metric for a tunable antenna system operating to receive a signal, e.g. a wireless signal. For example, an antenna system performance metric can include receiving wireless signals within a specific frequency range.

The tunable antenna system can be an applicable antenna system capable of being tuned in operation, such as the devices shown in any of FIGS. 1-6. For example, the tunable antenna system can include an array of metamaterials or sub-wavelength elements that have adjustable characteristics that allow for tuning of the tunable antenna system. More specifically, the tunable antenna system can include tunable impedance elements. Subsequently, impedances of the tunable impedance elements can be adjusted to tune or otherwise configure the tunable antenna system for a specific operation, e.g. to operate according to or to meet an antenna system performance metric.

Further, the tunable antenna system can comprise a periodic arrangement of geometrically identical unit cells. A periodic arrangement of geometrically identical unit cells can correspond to an array of elements in the tunable antenna system, e.g. tunable impedance elements in the tunable antenna system. For example, each tunable impedance element in an array of tunable impedance elements can form a single unit cell of a periodic arrangement of geometrically identical unit cells formed across the array of tunable impedance elements. In another example, a plurality of tunable impedance elements in an array of tunable impedance elements can form a single unit cell of a periodic arrangement of geometrically identical unit cells formed across the array of tunable impedance elements. Each unit cell of the geometrically identical unit cells can be formed by the same number of elements of the tunable antenna system at corresponding positions within the unit cell to form the unit cell. For example, each unit cell of a periodic arrangement of geometrically identical unit cells can be formed by a single tunable impedance element with a corresponding actual position at a center of a geometric representation of each unit cell.

A periodic arrangement of geometrically identical unit cells, included as part of the tunable antenna system, can correspond to only a portion of elements of the tunable antenna system. For example, only a portion of an array of tunable impedance elements of the tunable antenna system can make up a periodic arrangement of geometrically identical unit cells. Further in the example, a remaining portion of the array of tunable impedance elements can form unit cells separate from the periodic arrangement geometrically identical unit cells, e.g. forming cells that are geometrically distinct or are not in a periodic arrangement. Additionally, a periodic arrangement of geometrically identical unit cells can comprise a substantial portion of elements of a tunable antenna system. Specifically, a number of elements of a plurality of elements that form a periodic arrangement of geometrically identical unit cells can be above a specific threshold number. For example, 90% of tunable impedance elements in the tunable antenna system can correspond to or otherwise form a periodic arrangement of geometrically identical unit cells.

Figure 8A:
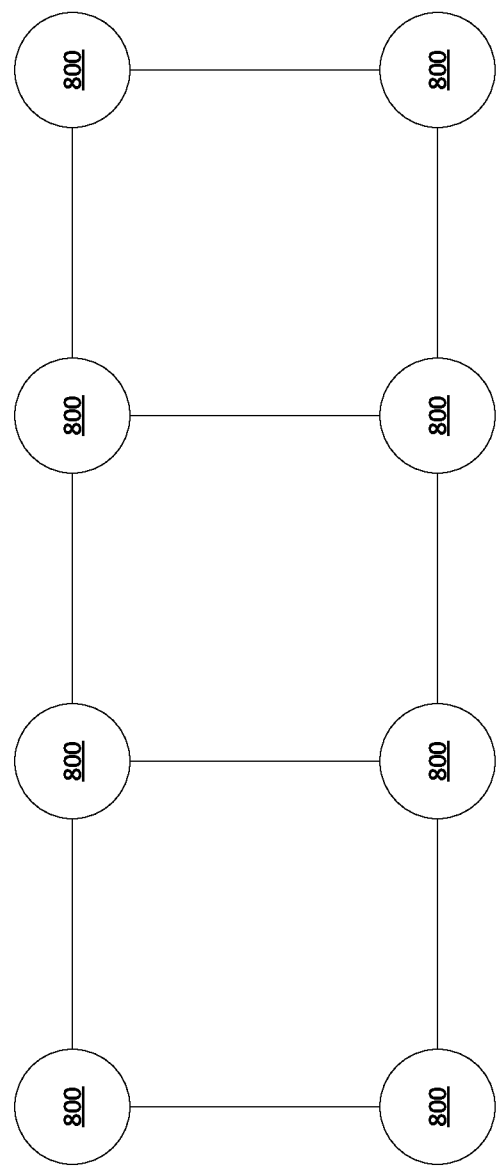
FIG. 8A illustrates a rectangular lattice pattern of unit cells.
Figure 8B:
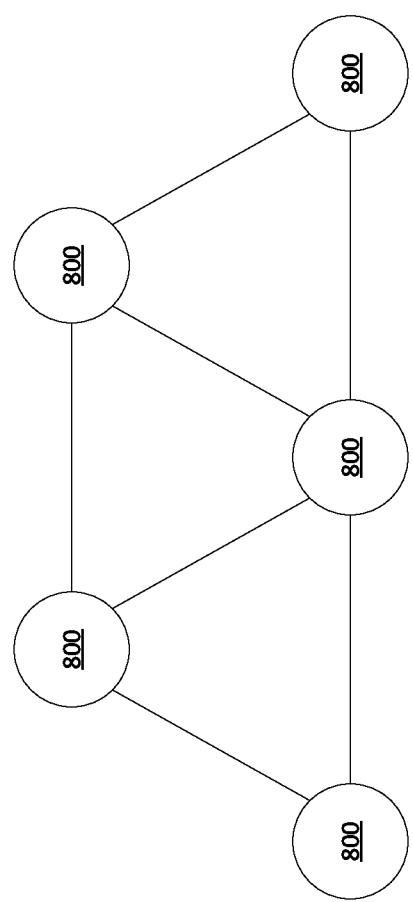
FIG. 8B illustrates a triangular lattice pattern of unit cells.
Figure 8C:
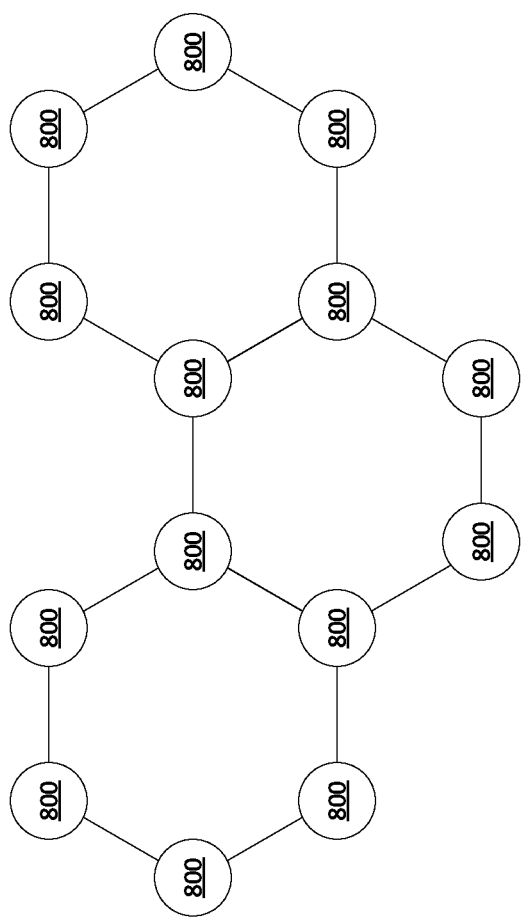
FIG. 8C illustrates a hexagonal lattice pattern of unit cells.

A periodic arrangement of geometrically identical unit cells can be periodic across one dimension. For example, a periodic arrangement of geometrically identical unit cells can include geometrically identical unit cells that are periodically repeated along a single axis or direction. Further, a periodic arrangement of geometrically identical unit cells can be periodic across two dimensions to form a two-dimensionally periodic arrangement. For example, a periodic arrangement of geometrically identical unit cells can include geometrically identical unit cells that are periodically repeated within a plane. More specifically, the unit cells, represented as circles 800 in FIGS. 8A-C which show different two-dimensionally periodic arrangements, can form a rectangular lattice, as shown in FIG. 8A, a triangular lattice, as shown in FIG. 8B, or a hexagonal lattice, as shown in FIG. 8C. Further a periodic arrangement of geometrically identical unit cells can be periodic across three dimensions to form a three-dimensionally periodic arrangement. For example, a periodic arrangement of geometrically identical unit cells can include geometrically identical unit cells that are periodically repeated within a volume of space. More specifically, unit cells can be repeated within a volume of space to form one of the three-dimensional Bravais lattices.

At step 704, in the flowchart 700, the tunable impedance elements are simulated as uniquely numbered lumped ports. The lumped ports can be uniquely numbered to a different number to allow for individual identification of each lumped port and corresponding tunable impedance elements of the ports. The tunable impedance elements can be mapped to or modeled as uniquely numbered lumped ports as part of simulating the tunable impedance elements as the uniquely numbered lumped ports. More specifically, each tunable impedance element can be mapped to or modeled as a uniquely numbered lumped port as part of simulating the tunable impedance elements as uniquely numbered lumped ports.

As the tunable impedance elements form or otherwise correspond to unit cells, the uniquely numbered lumped ports that simulate the tunable impedance elements can form or otherwise correspond to the unit cells. More specifically, the uniquely numbered lumped ports can form or otherwise correspond to unit cells in the periodic arrangement of geometrically identical unit cells of the tunable antenna system. For example, a first tunable impedance element can form a first unit cell in the periodic arrangement of geometrically identical unit cells. Further in the example, the first tunable impedance element can be simulated by a first lumped port of the uniquely numbered lumped ports. As follows, the first lumped port can form or otherwise correspond to the first unit cell in the periodic arrangement of geometrically identical unit cells.

The lumped ports used to simulate the tunable impedance elements can be identified or labeled, e.g. at step 704, as either a unique port or a periodic port. In various embodiments, all of the lumped ports used to simulate the tunable impedance elements can be labeled as either a unique port or a periodic port. The lumped ports can be identified as either unique ports or periodic ports such that all periodic ports belong to unit cells with identical geometry. More specifically, only lumped ports corresponding to tunable impedance elements in the geometrically identical unit cells of the tunable antenna system can labeled as periodic ports. This can ensure that all lumped ports that are identified as periodic ports belong to unit cells with identical geometry.

The lumped ports can be labeled as periodic ports based on whether the ports are labeled as unique ports. More specifically, a portion of the lumped ports can be labeled as unique ports and the remaining lumped ports not labeled as unique ports can subsequently be labeled as periodic ports. Conversely, the lumped ports can be labeled as unique ports based on whether the ports are labeled as periodic ports. More specifically, a portion of the lumped ports can be labeled as periodic ports and the remaining lumped ports not labeled as periodic ports can subsequently be labeled as unique ports.

The lumped ports can be identified as periodic ports based on geometric locations of the lumped ports in an array of identical unit cells. Specifically, the lumped ports can be identified as periodic ports based on locations of tunable impedance elements corresponding to the lumped ports in the periodic arrangement of geometrically identical unit cells of the tunable antenna system. More specifically, the lumped ports can be identified as periodic ports based on locations of the tunable impedance elements corresponding to the lumped ports in an array of tunable impedance elements. For example, if a port models a tunable impedance element in the center of an array of tunable impedance elements, then the port can be identified as a periodic port.

In identifying a lumped port as periodic ports based on position in an array of unit cells, the lumped port can be identified based on characteristics of unit cells surrounding a unit cell that included the lumped port. Specifically, a lumped port can be identified as a periodic port if a unit cell including the lumped port is at least one interaction radius away from any unit cells in an array of unit cells that contain a unique port. Further, a lumped port can be identified as a periodic port if a unit cell including the lumped port is at least one interaction radius away from any unit cells in an array of unit cells that form, at least in part, an edge of the array of unit cells. An interaction radius can include an applicable size or dimension defined with respect to sizes and dimensions of unit cells within an array of unit cells. For example, an interaction radius can include three unit cell diameters of unit cells in an array of unit cells, e.g. an array of identical unit cells.

The lumped ports can be identified as unique ports based on characteristics, e.g. physical or operational characteristics, of the lumped ports. For example, the lumped ports can be identified as unique ports based on whether the lumped ports serve as physical input/output ports for the tunable antenna system. In another example the lumped ports can be identified as unique ports based on whether the lumped ports are virtual ports. Additionally, the lumped ports can be identified as unique ports based on their corresponding physical location, e.g. physical locations of the corresponding tunable impedance elements forming the lumped ports. More specifically, the lumped ports can be identified as unique ports based on locations of the ports with respect to array edges, e.g. edges of an array of tunable impedance elements of the tunable antenna system, terminations, feeds, and other applicable non-periodic structures or elements in the tunable antenna system.

Next, at step 706, the tunable antenna system is characterized as a port network with a corresponding admittance or impedance matrix. More specifically, the tunable antenna system can be characterized as a port network with a corresponding admittance or impedance matrix for the port network comprising the tunable impedance elements simulated as uniquely numbered lumped ports. As discussed above with respect to FIG. 4, a corresponding admittance matrix can represent admittance parameters of elements of the tunable antenna system, e.g. admittance parameters of a port network simulated for the tunable impedance elements in the array of tunable impedance elements. Further, as discussed above with respect to FIG. 4, a corresponding impedance matrix can represent impedance parameters of elements of the tunable antenna system, e.g. impedance value of a port network simulated for the tunable impedance elements in the array of tunable impedance elements.

Next at step 708, the admittance or impedance matrix of the port network is approximated. In approximating the admittance or impedance matrix of the port network, the admittance or impedance matrixes can be determined without actually calculating the entire admittance or impedance matrix using applicable methods, such as the previously described methods for calculating an admittance or impedance matrix. This can reduce an amount of time and computational resources used in ultimately determining an optimal configuration of a tunable antenna system. Subsequently, an optimal configuration of a tunable antenna system can be calculated and implemented in a more efficient manner. This is particularly important as tunable impedance elements, e.g. metamaterial element arrays, of tunable antenna systems grow in size, thereby making optimal configuration calculation more costly in terms of both consumed time and consumed computational resources. Accordingly, approximating an admittance or impedance matrix without actually calculating the entire matrix according to applicable methods can effectively improve functioning of a computer by allowing a computer to more efficiently identify and subsequently configure or design a tunable antenna system according to an optimal configuration identified from the approximated admittance or impedance matrix.

The admittance or impedance matrix of the port network can be approximated based on periodicity of the tunable antenna system. In approximating the admittance or impedance matrix of the port network based on periodicity of tunable antenna system, the admittance or impedance matrix of the port network can be approximated based on the lumped ports, simulated at step 704, and included as part of the periodicity of the tunable antenna system. Further, in approximating the admittance or impedance matrix of the port network based on periodicity of the tunable antenna system, the admittance or impedance matrixes of the port network can be approximated based on unit cells corresponding to the lumped ports simulated at step 704.

In approximating the admittance or impedance matrix of the port network based on periodicity, the admittance or impedance matrix of the port network can be approximated using a subset of the total ports identified as periodic ports. For example, a substantial portion of the admittance or impedance matrix, e.g. over 50% of the admittance or impedance matrix can be approximated by estimating a small subset of the portion of the admittance or impedance matrix and repeating the estimated portion throughout the substantial portion. In only having to calculate a small subset of an admittance or impedance matrix and then approximating the entire matrix based on the calculated subset, large amounts of computational resources and time are conserved, thereby leading to easier control and design of tunable antenna systems.

The admittance or impedance matrix of the port network can be estimated based on periodic lumped ports, e.g. corresponding periodic unit cells to the periodic lumped ports. Specifically, at least a portion of the admittance or impedance matrix can be approximated by approximating diagonal elements of a matrix corresponding to the periodic ports. The diagonal elements of the matrix corresponding to the periodic ports can be approximated by simulating one unit cell of a plurality of unit cells that include the periodic ports. More specifically, the one unit cell can be simulated with periodic boundary conditions applied to the single unit cell. Alternatively, the diagonal elements of a matrix corresponding to the periodic ports can be approximated by simulating periodically repeatable group of unit cells selected from the unit cells that include the periodic ports. More specifically, the periodically repeatable group of unit cells can be simulated with periodic boundary conditions applied to the periodically repeatable group of unit cells.

Diagonal elements of a matrix can be approximated by assuming diagonal elements corresponding to the periodic ports are equal to each other. Based on this assumption, the diagonal elements corresponding to the periodic ports can be estimated only once, in order to estimate the admittance of impedance matrix. Accordingly, this further saves time and computational resources to determine an optimal configuration that would otherwise be used to actually calculate the estimate admittance or impedance matrix or further estimate the admittance or impedance matrix.

A periodically repeatable group of unit cells used to estimate the admittance or impedance matrix can include all unit cells immediately adjacent to a selected unit cell of the periodically repeatable group of unit cells. For example, a unit cell corresponding to a periodic lumped port in the center of an array of periodic lumped ports, e.g. an array of tunable impedance elements can be selected. Further in the example, the periodically repeatable group of unit cells can be formed to include all unit cells adjacent to the unit cell corresponding to the selected unit cell corresponding to the central periodic lumped port.

Additionally, a periodically repeatable group of unit cells used to estimate the admittance or impedance matrix can include all unit cells within an interaction radius of a selected unit cell of the periodically repeatable group of unit cells. As discussed previously, an interaction radius can include an applicable size or dimension defined with respect to sizes and dimensions of unit cells within an array of unit cells. Accordingly, if a central unit cell, e.g. corresponding to a centralized lumped periodic port, is selected, then a periodically repeatable group can be formed by all unit cells within three unit cell diameters from the centralized lumped periodic port.

The admittance or impedance matrix of the port network can be approximated based on unique numbering of the lumped ports as periodic ports and unique ports. More specifically, at step 702, lumped ports can be numbered based on whether they are identified as unique ports or periodic ports. For example, the lumped ports identified as unique ports can be numbered with sequential numbers before the lumped ports identified as periodic ports are numbered. Subsequently, the admittance or impedance or matrix of the port network can be formed with elements that corresponding to the lumped ports based on the numbering of the lumped ports according to whether the ports are identified as unique ports and periodic ports. Further in the example, as the unique ports are numbered sequentially with numbers next to each other, based on the numbering the unique ports can be represented in the admittance or impedance matrix within a specific area within the matrix defined according to the numbering of the unique ports. Still further in the example, the unique ports can be represented by a self-contained and self-defined area within the admittance or impedance matrix.

Further, the admittance or impedance matrix of the port network can be approximated by estimating off-diagonal elements. Off-diagonal elements used to estimate the admittance or impedance matrix can include off-diagonal elements of a matrix corresponding to couplings between the periodic ports. Further in the example, off diagonal elements of a matrix corresponding to couplings between periodic ports m and n can be approximated by simulating a periodically repeatable group of unit cells including periodic ports m and n. More specifically, periodic boundary conditions can be applied to the repeatable group of unit cells to ultimately approximate the admittance or impedance matrix using off-diagonal elements. As discussed previously, a periodically repeatable group of cells, e.g. used to estimate an admittance or impedance matrix using off-diagonal elements, can include all unit cells immediately adjacent to a selected unit cell or within an interaction radius, e.g. empirically selected interaction radius, of a unit cell.

Off-diagonal elements of a matrix can be approximated by assuming off-diagonal elements are equal to each other and therefore only estimated once. More specifically, off-diagonal elements of a matrix that correspond to couplings between elements in a geometric translation of a certain configuration, e.g. a periodic or non-periodic configuration of a tunable antenna system, can be set as equal to approximate the admittance or impedance matrix. Based on this assumption, the diagonal elements corresponding to the periodic ports can be estimated only once, in order to estimate the admittance of impedance matrix. Accordingly, this further saves time and computational resources to determine an optimal configuration that would otherwise be used to actually calculate the estimate admittance or impedance matrix or further estimate the admittance or impedance matrix.

Additionally, the admittance or impedance matrix of the port network can be approximated using the lumped ports identified as the unique ports. Either or both the off-diagonal elements and diagonal elements of a matrix associated with one or more unique ports can be estimated to approximate the admittance or impedance matrix of the port network. Further, the off-diagonal elements and diagonal elements of a matrix associated with the one or more unique ports can be approximated by simulating the entire port network for each of the unique ports, e.g. the unique ports that make up the matrix.

At step 710, an S-matrix is estimated for the port network of the tunable antenna system. The S-matrix can be estimated from the admittance or impedance matrix approximated at step 708. More specifically, the S-matrix can be estimated from the admittance or impedance matrix using an applicable method of calculating an S-matrix from an admittance or impedance matrix, such as the method described herein, e.g. as discussed previously with respect to FIG. 4. Additionally, the S-matrix can be estimated from the admittance of impedance matric estimated for the port network along with characteristic impedance values of the lumped ports.

Figure 9:
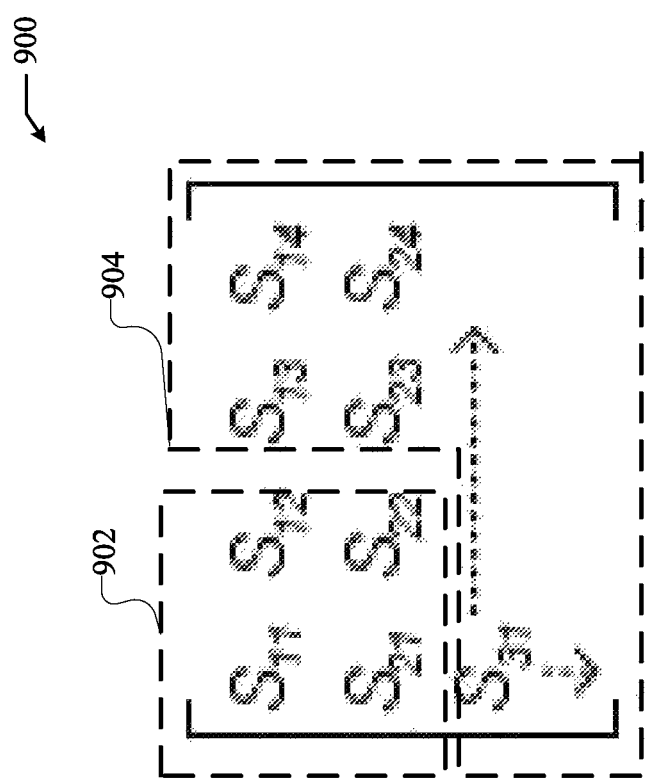
FIG. 9 illustrates an example S-matrix for use in determining an optimal configuration of the tunable antenna system.

FIG. 9 shows an example S-matrix 900 for use in determining an optimal configuration of the tunable antenna system. The S-matrix 900 includes a unique port block 902 and a periodic port block 904. As shown in FIG. 9, the unique port block 902 and the periodic port block 904 can both be self-contained within the S-matrix 900. Additionally, as shown in FIG. 9, the periodic port block 904 and the unique port block 902 can be separate from each other.

The unique ports of the lumped ports and the periodic ports of the lumped ports can be numbered, e.g. at step 704, to create the corresponding periodic port block 904 and the unique port block 902. More specifically, at either or both step 706 and 708, the admittance of impedance matrix can be characterized and subsequently approximated based on the numbering of the periodic ports and unique ports to form a corresponding periodic port block region and unique port block region in the admittance or impedance matrix. Subsequently, at step 710, the S-matrix with periodic port block 904 and the unique port block 902 can be estimated from the admittance or impedance matrix based on the corresponding periodic port block region and unique port block region in the admittance or impedance matrix.

At step 712, the antenna system performance metric is quantified using the estimated S-matrix of the port network. The antenna system performance metric can be quantified in order to identify configuration parameters of the tunable antenna system that can be adjusted or otherwise controlled to achieve the antenna system performance metric. For example, based on the estimated S-matrix of the port network, it can be identified to adjust impedance values of certain tunable impedance elements of the tunable antenna system in order to achieve the antenna system performance metric.

At step 714, an optimal configuration of the tunable antenna system for the antenna system performance metric is identified. The optimal configuration of the tunable antenna system can be determined for the antenna system performance metric can be identified based on responses of the tunable antenna system to variable impedances. More specifically, the optimal configuration of the tunable antenna system can be determined for the antenna system performance metric using one or a combination of the admittance matrix, the impedance matrix, and the S-matrix of the port network, e.g. as the S-matrix is used to quantify the antenna system performance metric. The identified optimal configuration of the tunable antenna system can include impedances of the tunable impedance elements modeled as the lumped ports in the port network.

Figure 10:
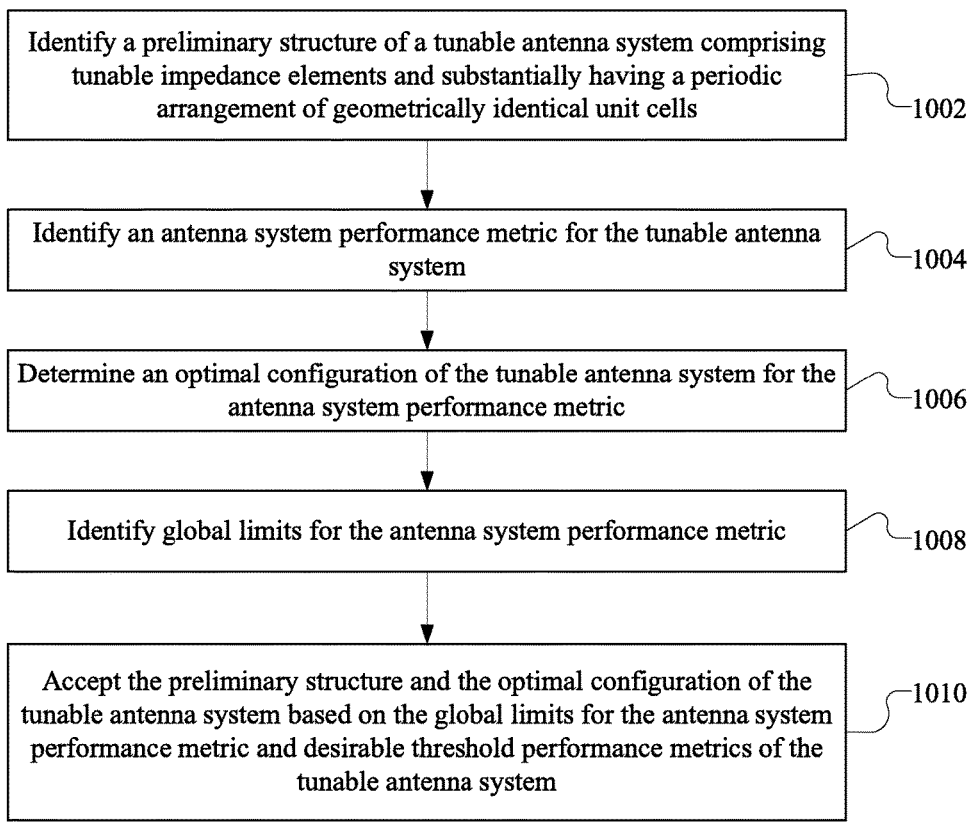
FIG. 10 is a flowchart of an example method of designing a structure of a tunable antenna system to meet an antenna system performance metric.

FIG. 10 is a flowchart 1000 of an example method of designing a structure of a tunable antenna system to meet an antenna system performance metric. The flowchart 1000 begins at step 1002, where a preliminary structure of a tunable antenna system comprising tunable impedance elements is identified. The tunable antenna system can have a periodic arrangement of geometrically identical unit cells.

The flowchart 1000 continues to step 1004, where an antenna system performance metric for the tunable antenna system is identified. As discussed previously, the antenna system performance metric can include a desired performance metric for a tunable antenna system to meet in operation.

The flowchart 1000 continues to step 1006, where an optimal configuration of the tunable antenna system is determined for the antenna system performance metric. An optimal configuration of the tunable antenna system can be determined for the antenna system performance metric using an applicable method of identifying an optimal configuration of a tunable antenna system such as the methods described herein. More specifically, an optimal configuration of the tunable antenna system can be determined using a method of identifying an optimal configuration of a tunable system by estimating an admittance matrix or an impedance matrix, such as the method represented by the flowchart 700 shown in FIG. 7. An optimal configuration of the tunable antenna system can correspond to and otherwise be determined based on the preliminary structure of the tunable antenna system. For example, an optimal configuration of the tunable antenna system can be determined from an impedance matrix estimated for a port network modeling the preliminary structure of the tunable antenna system.

The flowchart 1000 continues to step 1008, where global limits for the antenna performance metric are identified. Global limits for the antenna performance metric can include values of configurable parameters of a tunable antenna system that are acceptable for still meeting the antenna performance metric globally across one or more different tunable antenna systems. For example, global limits for the antenna performance metric can include a range of frequencies at which wireless signals can be transmitted.

The flowchart 1000 continues to step 1010, where the preliminary structure and the optimal configuration of the tunable antenna system are accepted based on the global limits for the antenna system performance metric. More specifically, the preliminary structure and the optimal configuration of the tunable antenna system can be accepted if the global limits for the antenna system performance metric exceed desirable threshold performance metrics of the tunable antenna system. Desirable threshold performance metrics of the tunable antenna system can correspond to the preliminary structure of tunable antenna system. More specifically, desirable threshold performance metrics of the tunable antenna system can include performance metrics capable of being achieved by the tunable antenna structure at the preliminary structure according to the optimal configuration of the tunable antenna system.

Although not shown in flowchart 1000, if the structure and/or optimal configuration of the tunable antenna system are not accepted, then the preliminary structure of the tunable antenna system can subsequently be altered to identify an altered structure of the tunable antenna system. Subsequently, another optimal configuration of the tunable antenna system can be identified with respect to the antenna system performance metric for the altered structure of the tunable antenna system. Then, the altered structure of the tunable antenna system and the another optimal configuration of the tunable antenna system can be accepted if the global limits of the antenna system performance metric exceed desirable threshold performance metrics of the tunable antenna system corresponding to the altered structure of the tunable antenna system. This process can be repeated until a structure of the tunable antenna system and a corresponding optimal configuration for the structure are actually accepted.

The techniques described herein, therefore, provides efficient techniques for beamforming signals with metamaterial antenna components. These techniques particularly leverage reciprocity (time invariance) of electromagnetic propagation channels that are not "polluted" by non-time-invariant components (such as EM nonlinearities and DC magnetic field generators) using tunable metamaterial components on a source device to provide unique and flexible advantages over traditional signal transmission techniques (e.g., full channel-sounding algorithms present in MIMO systems, etc.). Importantly, these techniques can be employed by a single source device where the target device only needs to periodically (or on demand) transmit a reference signal.

While there have been shown and described illustrative embodiments that provide for beamforming signals between source and target devices, it is to be understood that various other adaptations and modifications may be made within the spirit and scope of the embodiments herein. For example, the embodiments have been shown and described herein with relation specific tunable metamaterial configurations/components on the source device. However, the embodiments in their broader sense are not as limited to such configurations/components, and may, in fact, be used with any number of devices and similar configurations, as is appreciated by those skilled in the art. Accordingly, it is appreciated the features, structures, and operations associated with one embodiment may be applicable to or combined with the features, structures, or operations described in conjunction with another embodiment of this disclosure. Additionally, in many instances, well-known structures, materials, or operations are not shown or described in detail to avoid obscuring aspects of this disclosure.

Those having skill in the art will appreciate that many changes may be made to the details of the above-described embodiments without departing from the underlying principles of the invention. The scope of the present invention should, therefore, be determined only by the following claims.

The invention claimed is:

1. A method comprising:
   identifying an antenna system performance metric for a tunable antenna system comprising tunable impedance elements, wherein a substantial portion of the tunable antenna system comprises a periodic arrangement of geometrically identical unit cells;
   simulating the tunable impedance elements as uniquely numbered lumped ports;
   characterizing the tunable antenna system as a port network with a corresponding admittance or impedance matrix;
   approximating the admittance or impedance matrix of the port network using periodicity of the tunable antenna system;
   estimating an S-matrix of the port network using the approximated admittance or impedance matrix of the port network and characteristic impedance values of the lumped ports;
   using the S-matrix of the port network to quantify the antenna system performance metric; and
   determining an optimal configuration of the tunable antenna system with respect to the antenna system performance metric from responses of the tunable antenna system to variable impedances using the admittance or impedance matrix of the port network, the optimal configuration of the tunable antenna system including impedances of the tunable impedance elements modeled as the lumped ports in the port network.

2. The method of claim 1, wherein approximating the admittance or impedance matrix of the port network includes organizing the lumped ports into periodic ports and one or more unique ports, such that all periodic ports belong to unit cells with identical geometry.

3. The method of claim 2, wherein approximating the admittance or impedance matrix of the port network includes approximating diagonal elements of a matrix corresponding to the periodic ports by simulating one unit cell of the unit cells to which the periodic ports belong with periodic boundary conditions applied to the one unit cell.

4. The method of claim 2, wherein approximating the admittance or impedance matrix of the port network includes approximating diagonal elements of a matrix corresponding to the periodic ports by simulating a periodically repeatable group of unit cells of the unit cells to which the periodic ports belong with periodic boundary conditions applied to the periodically repeatable group of unit cells.

5. The method of claim 4, wherein the periodically repeatable group of unit cells includes all unit cells immediately adjacent to a selected unit cell of the periodically repeatable group of unit cells.

6. The method of claim 4, wherein the periodically repeatable group of unit cells includes all unit cells that are closer to a selected unit cell of the periodically repeatable group of unit cells than an empirically selected interaction radius.

7. The method of claim 4, wherein the diagonal elements corresponding to the periodic ports are equal to each other, and are estimated only once for one of the periodic ports.

8. The method of claim 2, wherein approximating the admittance or impedance matrix of the port network includes approximating off-diagonal elements (m,n) of a matrix corresponding to couplings between periodic ports "m" and "n" by simulating a periodically repeatable group of unit cells of the system to which both periodic ports "m" and "n" belong with periodic boundary conditions applied to the group of unit cells.

9. The method of claim 8, wherein a group of unit cells includes all unit cells immediately adjacent to a selected unit cell.

10. The method of claim 8, wherein a group of unit cells includes all unit cells that are closer to a selected unit cell than an empirically selected interaction radius.

11. The method of claim 8, wherein all off-diagonal elements of the matrix that correspond to coupling between elements in a geometric configuration that is a periodic translation of a certain configuration, are all equal to each other, and estimated only once for each unique coupling configuration.

12. The method of claim 2, wherein approximating the admittance or impedance matrix of the port network includes approximating diagonal and off-diagonal elements of a matrix that are associated with any of the unique ports by simulating an entire port network, for each of the unique ports.

13. The method of claim 2, wherein the one or more unique ports of the lumped ports are numbered such that corresponding unique port cells of the unit cells form a unique port block within the S-matrix, wherein the unique port block is self-contained within the S-matrix.

14. The method of claim 2, wherein the periodic ports are numbered such that corresponding periodic port cells of the plurality of cells form a periodic port block within the S-matrix, wherein the periodic port block is self-contained within the S-matrix and separate from a unique port block of the S-matrix.

15. The method of claim 2, wherein the periodic ports are identified based on geometric locations of the lumped ports in the array of identical unit cells.

16. The method of claim 15, wherein the periodic ports are identified based on being inside a unit cell that is at least one interaction radius away from any of the unit cells containing unique ports, or from unit cells comprising edges of the array.

17. The method of claim 16, wherein the interaction radius is defined as three unit cell diameters.

18. The method of claim 15, wherein the one or more unique ports are identified from a remainder of the lumped ports in the array of lumped ports that are not classified as the periodic ports.

19. The method of claim 1, wherein the periodic arrangement is periodic in one dimension.

20. The method of claim 1, wherein the periodic arrangement is periodic in two dimensions to form a two-dimensionally periodic arrangement.

21. The method of claim 1, wherein the periodic arrangement is periodic in three dimensions to form a three-dimensionally periodic arrangement.

22. A tunable antenna system comprising:
a periodic arrangement of geometrically identical unit cells; and
tunable impedance elements, wherein the tunable impedance elements are tuned according to an optimal configuration of the tunable antenna system for an antenna system performance metric selected by:
simulating the tunable impedance elements as uniquely numbered lumped ports;
characterizing the tunable antenna system as a port network with a corresponding admittance or impedance matrix;
approximating the admittance or impedance matrix of the port network using periodicity of the tunable antenna system;
estimating an S-matrix of the port network using the approximated admittance or impedance matrix of the port network and characteristic impedance values of the lumped ports;
using the S-matrix of the port network to quantify the antenna system performance metric; and
determining the optimal configuration of the tunable antenna system with respect to the antenna system performance metric from responses of the tunable antenna system to variable impedances using the admittance or impedance matrix of the port network, the optimal configuration of the tunable antenna system including impedances of the tunable impedance elements modeled as the lumped ports in the port network.

23. The system of claim 22, wherein approximating the admittance or impedance matrix of the port network includes organizing the lumped ports into periodic ports and one or more unique ports, such that all periodic ports belong to unit cells with identical geometry.

24. The system of claim 23, wherein approximating the admittance or impedance matrix of the port network includes approximating diagonal elements of a matrix corresponding to the periodic ports by simulating one unit cell of the unit cells to which the periodic ports belong with periodic boundary conditions applied to the one unit cell.

25. The system of claim 23, wherein approximating the admittance or impedance matrix of the port network includes approximating diagonal elements of a matrix corresponding to the periodic ports by simulating a periodically repeatable group of unit cells of the unit cells to which the periodic ports belong with periodic boundary conditions applied to the periodically repeatable group of unit cells.

26. The system of claim 25, wherein the periodically repeatable group of unit cells includes all unit cells immediately adjacent to a selected unit cell of the periodically repeatable group of unit cells.

27. The system of claim 25, wherein the periodically repeatable group of unit cells includes all unit cells that are closer to a selected unit cell of the periodically repeatable group of unit cells than an empirically selected interaction radius.

28. The system of claim 25, wherein the diagonal elements corresponding to the periodic ports are equal to each other, and are estimated only once for one of the periodic ports.

29. The system of claim 23, wherein approximating the admittance or impedance matrix of the port network includes approximating off-diagonal elements (m,n) of a matrix corresponding to couplings between periodic ports "m" and "n" by simulating a periodically repeatable group of unit cells of the system to which both periodic ports "m" and "n" belong with periodic boundary conditions applied to the group of unit cells.

30. The system of claim 23, wherein a group of unit cells includes all unit cells immediately adjacent to a selected unit cell.

31. The system of claim 23, wherein a group of unit cells includes all unit cells that are closer to a selected unit cell than an empirically selected interaction radius.

32. The system of claim 23, wherein all off-diagonal elements of the matrix that correspond to coupling between elements in a geometric configuration that is a periodic translation of a certain configuration, are all equal to each other, and estimated only once for each unique coupling configuration.

33. The system of claim 23, wherein approximating the admittance or impedance matrix of the port network includes approximating diagonal and off-diagonal elements of a matrix that are associated with any of the unique ports by simulating an entire port network, for each of the unique ports.

34. The system of claim 23, wherein the one or more unique ports of the lumped ports are numbered such that corresponding unique port cells of the unit cells form a unique port block within the S-matrix, wherein the unique port block is self-contained within the S-matrix.

35. The system of claim 23, wherein the periodic ports are numbered such that corresponding periodic port cells of the plurality of cells form a periodic port block within the S-matrix, wherein the periodic port block is self-contained within the S-matrix and separate from a unique port block of the S-matrix.

36. The system of claim 23, wherein the periodic ports are identified based on geometric locations of the lumped ports in the array of identical unit cells.

37. The system of claim 36, wherein the periodic ports are identified based on being inside a unit cell that is at least one interaction radius away from any of the unit cells containing unique ports, or from unit cells comprising edges of the array.

38. The system of claim 37, wherein the interaction radius is defined as three unit cell diameters.

39. The system of claim 36, wherein the one or more unique ports are identified from a remainder of the lumped ports in the array of lumped ports that are not classified as the periodic ports.

40. The system of claim 22, wherein the periodic arrangement is periodic in one dimension.

41. The system of claim 22, wherein the periodic arrangement is periodic in two dimensions to form a two-dimensionally periodic arrangement.

\* \* \* \* \*